(12) United States Patent
Forlines et al.

(10) Patent No.: US 7,640,518 B2
(45) Date of Patent: Dec. 29, 2009

(54) METHOD AND SYSTEM FOR SWITCHING BETWEEN ABSOLUTE AND RELATIVE POINTING WITH DIRECT INPUT DEVICES

(75) Inventors: Clifton Forlines, Brookline, MA (US); Ravin Balakrishnan, Toronto (CA)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 687 days.

(21) Appl. No.: 11/452,810

(22) Filed: Jun. 14, 2006

(65) Prior Publication Data

US 2007/0291007 A1 Dec. 20, 2007

(51) Int. Cl.
*G06F 3/033* (2006.01)
*G06F 3/041* (2006.01)

(52) U.S. Cl. .................. 715/863; 715/700; 715/866; 345/156; 345/173

(58) Field of Classification Search .......... 345/156, 345/157, 163, 167, 173, 179, 180, 181, 182; 715/700, 863, 866
See application file for complete search history.

(56) References Cited

U.S. PATENT DOCUMENTS 6,115,028 A * 9/2000 Balakrishnan et al. ...... 345/157
6,292,172 B1 * 9/2001 Makhlouf ................... 345/157
2006/0244735 A1 * 11/2006 Wilson ....................... 345/173

OTHER PUBLICATIONS

Accot, J. and Zhai, S. Performance evaluation of input devices in trajectory-based tasks: an application of the steering law. in Proc. of ACM SIGCHI Conference on Human Factors in Computing Systems, (Pittsburgh, PA, 1999), 466-472.
Baudisch, P., Cutrell, E., Hinckley, K. and Gruen, R., Mouse ether: accelerating the acquisition of targets across multi-monitor displays. in CHI '04 extended abstracts, (Vienna, Austria, 2004), 1379-1382.
Baudisch, P., Cutrell, E. and Robertson, G., High-Density Cursor: A Visualization Technique that Helps Users Keep Track of Fast-Moving Mouse Cursors. in Proceedings of the ninth IFIP TC13 international conference on Human-Computer Interaction—INTERACT2003, (Zürich, Switzerland, 2003), Springer, 236-243.
Baudisch, P., Cutrell, E., Robbins, D., Czerwinski, M., Tandler, P., Bederson, B. and Zierlinger, A., Drag-and-Pop and Drag-and-Pick: Techniques for Accessing Remote Screen Content on Touch and Pen operated Systems. in Proceedings of the ninth IFIP TC13 international conference on Human-Computer Interaction, (Zürich, Switzerland, 2003), 57-64.

(Continued)

*Primary Examiner*—My-Chau T Tran
(74) *Attorney, Agent, or Firm*—Dirk Brinkman; Gene Vinokur

(57) ABSTRACT

A method maps positions of a direct input device to locations of a pointer displayed on a surface. The method performs absolute mapping between physical positions of a direct input device and virtual locations of a pointer on a display device when operating in an absolute mapping mode, and relative mapping between the physical positions of the input device and the locations the pointer when operating in a relative mapping mode. Switching between the absolute mapping and the relative mappings is in response to control signals detected from the direct input device.

21 Claims, 9 Drawing Sheets

OTHER PUBLICATIONS

Bezerianos, A. and Balakrishnan, R., The vacuum: facilitating the manipulation of distant objects. in Proceedings of the SIGCHI conference on Human factors in computing systems, (Portland, Oregon, USA, 2005), ACM Press, 361-370.

Bier, E. A., Stone, M. C., Pier, K., Buxton, W., and DeRose, T. D. 1993. Toolglass and magic lenses: the see-through interface. In Proceedings of the 20th Annual Conference on Computer Graphics and interactive Techniques SIGGRAPH '93. ACM Press, New York, NY, 73-80.

Buxton, W., A three-state model of graphical input. in Proc. of the IFIP TC13 Third Interantional Conference on Human-Computer Interaction, (North-Holland, 1990), 449-456.

Esenther, A. and Ryall, K. Fluid DTMouse: Better Mouse Support for Touch Based Interactions. in Proc. of Advanced Visual Interfaces (2006, in press).

Fitzmaurice, G., Khan, A., Pieke, R., Buxton, B., and Kurtenbach, G. (2003). Tracking menus. ACM Symp. on User Interface Software and Technology. p. 71-79.

Goldberg, D. and Goodisman, A. Stylus user inter-faces for manipulating text. in Proc. of the ACM Symposium on User Interface Software and Technology, (Hilton Head, SC, USA, 1991), 127-135.

Graham, E. and MacKenzie, C. Physical versus virtual pointing. in Proc. of the CHI '96 Conf. on Human Factors in Computing Systems, (Vancouver, BC, Canada, 1996), 292-299.

Grossman, T., Hinckley, K. Baudisch, P., Agrawala, M., Balakrishnan, R. Hover Widgets: Using the Tracking State to Extend the Capabilities of Pen-Operated Devices. To appear in Proceedings of CHI 2006, Montreal, Canada, Apr. 2006.

Johanson, B., Hutchins, G., Winograd, T., Stone, M., PointRight: Experience with Flexible Input Redirection in Interactive Workspaces. in Proc. of the ACM Conf. on User Interface and Software Technology, (Paris, France, 2002), 227-237.

MacKenzie, I. S. and Oniszczak, A., A comparison of three selection techniques for touchpads. in Proc. of the SIGCHI conference on Human factors in computing systems, (Los Angeles, California, United States, 1998), ACM Press, 336-343.

Meyer, S., Cohen, O. and Nilsen, E. Device comparisons for goal-directed drawing tasks. in Extended Abstracts of the 1994 Conference on Human Factors in Computing Systems—CHI '94, (Portland, Oregon, USA), ACM Press, 251-252.

Myers, B., Bhatnagar, R., Nichols, J., Peck, C.H., Kong, D., Miller, R. and Long, C., Interacting at a distance: measuring the performance of laser pointers and other devices. in Proc. of ACM CHI Conference on Human Factors in Computing Systems, (Minneapolis, Minnesota, USA, 2002), 33-40.

Nacenta, M.A., Aliakseyeu, D., Subramanian, S. and Gutwin, C., A comparison of techniques for multi-display reaching. in Proceedings of the SIGCHI conference on Human factors in computing systems, (Portland, Oregon, USA, 2005), 371-380.

Parker, J.K., Mandryk, R. L. and Inkpen, K.M., TractorBeam: seamless integration of local and remote pointing for tabletop displays. in Proceedings of the 2005 conference on Graphics interface, (Victoria, British Columbia, 2005), Canadian Human-Computer Communications Society, 33-40.

Poupyrev, I., Billinghurst, M., Weghorst, S. and Ichikawa, T., The go-go interaction technique: non-linear mapping for direct manipulation in VR. in Proceedings of the 9th annual ACM symposium on User interface software and technology, (Seattle, Washington, United States, 1996), 79-80.

Rekimoto, J. and Saitoh, M.,. Augmented Surfaces: A spatially continuous work space for hybrid computing environments. in Proceedings of the ACM Conference on Human Factors in Computing Systems—CHI '99, (Pittsburgh, Pennsylvania, USA, 1999), 378-385.

Sears, A. and Shneiderman, B. High Precision Touchscreens: Design Strategies and Comparisons with a Mouse. International Journal of Man-Machine Studies, 34(4). 593-613.

Shen, C., Everitt, K., Ryall, K., UbiTable: Impromptu Face-to-Face Collaboration on Horizontal Interactive Surfaces. in Proceedings of the Fifth International Conference on Ubiquitous Computing, (Seattle, Washington, USA, 2003), 281-288.

Shneiderman, B. Touchscreens now offer compelling uses. IEEE Software, 8 (2). 93-94,107.

Streitz, N., Geißler, J., Holmer, T., Konomi, S., Müller-Tomfelde, C., Reischl, W., Rexroth, P., Seitz, P., and Steinmetz, R.., i-LAND: An interactive Landscape for Creativity and Innovation. in Proc. of the ACM Conf. on Human Factors in Computing Systems, (1999), 120-127.

Vogel, D. and Balakrishnan, R., Distant freehand pointing and clicking on very large, high resolution displays. in Proceedings of the 18th annual ACM symposium on User interface software and technology, (Seattle, WA, USA, 2005), 33-42.

\* cited by examiner

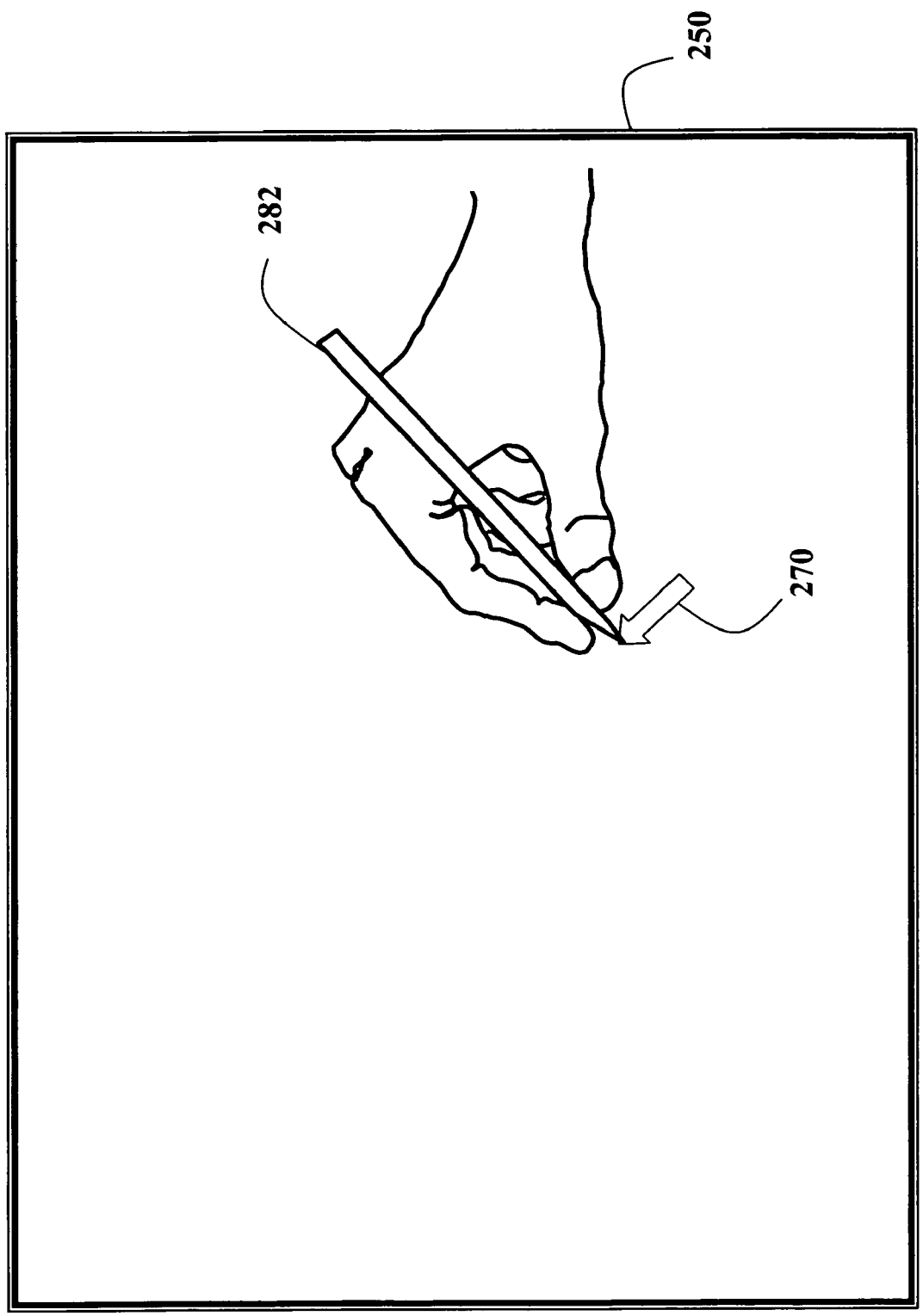

METHOD AND SYSTEM FOR SWITCHING BETWEEN ABSOLUTE AND RELATIVE POINTING WITH DIRECT INPUT DEVICES

FIELD OF THE INVENTION

This invention relates generally to graphical applications and more particularly to controlling graphical applications with a direct pointing input device.

BACKGROUND OF THE INVENTION

Indirect and Direct Input Devices

Typically, a computer implemented graphical application is controlled with a pointing input device. Indirect pointing devices include a mouse, a trackball and a touch pad, and direct pointing devices include touch sensitive display surfaces. The interaction with graphical objects is typically represented by a graphical pointer displayed by the application on an output device. Movement of the input device results in corresponding movement of the pointer on the output device.

With an indirect input device, such as a mouse, touch pad, or trackball, the input device and the pointer are physically separate. Moreover, the input device typically moves on a horizontal plane of a desktop or touch pad, while the pointer moves on a vertical plane of the display device. When using a direct pointing input device such as a touch-sensitive surface, graphical objects are manipulated directly by touching them on the display surface. Direct input modalities are a viable alternative to indirect input, such as using a mouse.

Absolute and Relative Mapping

The mapping between a position of the pointing device and a location of the pointer can be either absolute or relative. Most direct pointing input devices use an absolute mapping. That is, the pointer is positioned directly under a finger or a stylus used for the pointing. While this is the most obvious, and arguably the most natural mapping, there are drawbacks. Hands, arms, fingers, and stylus can occlude portions of the display. This can be a nuisance in both single and multi-user systems.

For many rear-projection output devices, accurate pointing and selection are hindered by parallax error. For front-projection, the finger or hand casts a shadow over the object of attention.

On a small display all areas of the user interface are easily within reach, on a large display this may not be the case. Using direct input devices loses its desirability the more users must stretch their arms, twist their body, or physically walk to distant parts of a display. In extreme cases, it may become impossible to reach the entire extent of very large displays. These difficulties only increase when working in a large, multi-display environment in which distant graphical objects may not only be hard to reach, but also may require the user to interact across bevels or even gaps between displays. For example, directly moving a pointer on a display surface that is several square meters large is awkward, and perhaps physically impossible.

Indirect pointing overcomes many of these limitations, albeit perhaps at the cost of naturalness. The main benefit in terms of large, wall-sized displays is that distant targets can be manipulated without walking, as small movements of the indirect input device can be mapped to large movements of the pointer. The opposite is also true. Relative mapping with indirect input devices allows for more control over pointing because control-display (CD) gain ratios can be less than 1:1 for slow movements and more accurate pointing.

Occlusion and parallax error are also less of a problem with indirect pointing. In addition, dragging pointers between different displays is easily supported, and all areas of a large display are easily selected. In multi-user setting, users can reposition themselves such that they do not block the view of collaborators.

Regarding the performance of indirect and direct pointing, the prior art describes different conclusions. Sears et al. compared indirect mouse input to direct touch screen input. Their experiment used a 27.6 by 19.5 cm display with a mouse CD gain close to 1. For targets that are 16 pixels in width and greater, they found direct selection using a touch-sensitive screen was faster than indirect selection with a mouse. Furthermore, for targets 32 pixels in width of greater, direct touch selection resulted in about 66% fewer errors than with an indirect mouse. Yet, even with the apparent superior performance of direct touch input modality, participants still preferred mouse input, Sears, A. and Shneiderman, B., "High Precision Touchscreens: Design Strategies and Comparisons with a Mouse," International Journal of Man-Machine Studies, 34(4). 593-613, 1991.

Meyer et al. also compared direct input devices with indirect input devices. They found that when used in an indirect manner, with physically separated control and display areas, the indirect device performed better than the direct device. In fact, they found all direct input devices to be slower than the indirect devices, Myers, B., Bhatnagar, R., Nichols, J., Peck, C. H., Kong, D., Miller, R. and Long, C., "Interacting at a distance: measuring the performance of laser pointers and other devices," in Proc. of ACM CHI Conference on Human Factors in Computing Systems, pp. 33-40, 2002.

On the other hand, Graham et al. compared selection performance using direct physical and indirect virtual touching. In the physical mode, users selected targets with their hand directly on a physical surface, but in the virtual mode, the user's hand was hidden and rendered as a "virtual finger" on a display. There was no performance difference between techniques for the initial movement phase, but virtual touching was slower in the second movement phase as the hand decelerated to select small 3 to 12 mm targets. This suggests that direct input can outperform indirect input in some situations, Graham, E. and MacKenzie, C. Physical versus virtual pointing. in Proc. of the CHI '96 Conf. on Human Factors in Computing Systems, pp. 292-299, 1996.

Those results are in contrast to the results described by Accot et al. They found that for steering tasks users were about twice as fast with an 8"×6" indirect touch tablet in absolute mode, than with a smaller indirect touchpad in relative mode, Accot, J. and Zhai, S. Performance evaluation of input devices in trajectory-based tasks: an application of the steering law. in Proc. of ACM SIGCHI Conference on Human Factors in Computing Systems, pp. 466-472, 1999.

One absolute, indirect input device is described by, J. K., Mandryk, R. L., and Inkpen, K. M., "TractorBeam: seamless integration of local and remote pointing for tabletop displays," in Proceedings of the 2005 conference on Graphics interface, Human-Computer Communications Society, pp. 33-40, 2005. That system uses a handheld Polhemus Fastrak tethered pointing device for six degrees of freedom motion tracking. The displayed pointer, in this case a virtual laser dot, is always displayed on a tabletop exactly where the handheld pointer is aimed. However, accurate selection of distant targets with a handheld devices is well known to be difficult and error prone. It is impossible to hold a hand steady for an extended length of time. Jitter is inevitable. This makes the usability of handheld direct input devices questionable for large displays, Myers, B., Bhatnagar, R., Nichols, J., Peck, C.

H., Kong, D., Miller, R. and Long, C., "Interacting at a distance: measuring the performance of laser pointers and other devices," in Proc. of ACM CHI Conference on Human Factors in Computing Systems, pp. 33-40, 2003.

There is also an issue of reach with large displays or across multiple displays. Many prior art solutions repurpose large areas of the workspace or display graphical feedback over a wide area of the display. While that approach is fine for an individual user on a wall-sized display, the heavy use of graphics may be inappropriate for multi-user workspaces in which other users may become distracted by these techniques.

Baudisch et al. described Drag-and-Pop as a means of moving a selected object to a distant target. When that technique is invoked, proxies for distant targets are drawn near the user where the proxies are easily within reach. Reference lines connect these proxies to their true targets. However, there is a good chance that these reference lines might cut through another's workspace in a multi-user setting. Additionally, Baucisch's technique does not allow for the selection of the area around target objects, only the selection of the objects themselves. Baudisch, P., Cutrell, E., Robbins, D., Czerwinski, M., Tandler, P., Bederson, B. and Zierlinger, A., "Drag-and-Pop and Drag-and-Pick: Techniques for Accessing Remote Screen Content on Touch and Pen operated Systems," in Proceedings of the ninth IFIP TC13 international conference on Human-Computer Interaction, pp. 57-64, 2003.

Similarly, Bezerianos et al. described the Vacuum technique for selecting distant objects. The Vacuum displays a large adjustable area of effect that can easily cover much of the display as distant targets are drawn close to the user. Like Drag-and-Pop, the disruption of other users working in the same space may reduce the benefits of addressing the reachability problem of large displays, Bezerianos, A. and Balakrishnan, R., "The vacuum: facilitating the manipulation of distant objects," in Proceedings of the SIGCHI conference on Human factors in computing systems, ACM Press, pp. 361-370, 2005, incorporated herein by reference.

FIG. 1A shows a three state model for a direct input and absolute only mapping system, Buxton, W., "A three-state model of graphical input," in Proc. of the IFIP TC13 Third International Conference on Human-Computer Interaction, pp. 449-456, 1990. That system uses a stylus with a tip switch, and a horizontal display surface. When the stylus is not in contact with the surface the system is in State 0 101. The tip switch is open, and the stylus is considered to be out of range. Movement of the stylus has no effect. When the stylus is on the surface, a displayed pointer absolutely tracks the movement of the stylus and the system is in State 1 102. When the stylus is pressed hard on the surface, the tip switch is closed, and a displayed graphical object coincident with the pointer is absolutely dragged in State 2 103. Removing pressure on the stylus, while keeping the stylus in contact with the display surface opens the tip switch and 'releases' the graphic object, and the system reverts to State 1. Lifting the stylus cause the system to enter State 0. This emulates the actions of an indirect input device, such a mouse, where closing the switch has the same effect as pressing the left button on the mouse while moving the mouse.

For relative mapping, one needs to support not only tracking, and dragging/selection, but also clutching. FIG. 1B shows a modified three-state model for a mouse pen with relative only mapping. The mouse pen is operated by moving the tip of the mouse pen on a surface. The mouse pen also includes a switch. When the mouse pen is in light contact with surface the switch is open, and the displayed pointer tracks the movements of the pen, but unlike the absolute stylus in FIG. 1A, the graphical pointer is not directly under the tip of the pen. This is a relative tracking state 104. Lifting the pen up and slightly away from the surface signals a clutching action, which is referred to as the clutching state 103. Putting the pen in contact with the surface returns to the tracking state 104, except that the pointer now moves relative to where the pointer was before the clutching action took place. This is similar to lifting a mouse from the work surface, and placing the mouse elsewhere. The pointer initially remains at the location where it was, and then can be moved again with the mouse at a different position. Pressing the pen onto the surface closes the switch and selects a graphical object under the graphical pointer and drags the object. This is the dragging state 105.

When tracking and dragging, the CD gain between the input device and pointer movement can vary as a function of stylus velocity. Typically, this is referred to as a pointer acceleration function.

Intuitively, absolute mapping should perform well when distances to be traversed are small, whereas a relative mapping is best when distances are large. However, the affordance of an absolute "under-the-stylus" mapping may be so strong that users could find using a relative mapping difficult or unnatural, lowering performance even at large distances. Further, using a relative mapping for a graphical object that is far away might result in the object is being harder to see and select than in an absolute mapping mode where the user is always visually close to the object.

FIG. 1C shows the results of an experiment in which user performance is compared for an object target selection task between absolute (FIG. 1A) and relative (FIG. 1B) mapping modes for direct input on a large wall-sized display. The graphs in FIG. 1C show selection times for targets at different distances for both absolute and relative mapping. The crossover in performance between absolute and relative mapping occurs at distances of about two meters. Object distances in this experiment range from about 1000 pixels to almost 4000 pixels of the display, which corresponds to physical distances between one to four meters.

As one can see from the graph, users perform better when using absolute mapping for nearby objects, and performed better when using relative mapping for distant objects. This crossover in performance indicates that when working on a single large display, which has a cross sectional width larger than two meters is over 2 m, users may benefit from being able to select an absolute or relative mapping when using their input device to work with differently distances.

In a similar experiment, participants used both absolute and relative mapping on a TabletPC with a 12.1" diagonal display. Participants were significantly faster at and greatly preferred selecting targets with absolute mapping for objects on this small display. However, for small objects, users were more accurate when using relative mapping.

This tradeoff among speed, preference, and accuracy indicates that users may benefit from being able to switch to relative mapping when a high level of accuracy is required.

Multi-display environments, such as that described by Streitz et al. have generated a lot of interest in recent years. These environments often include a heterogeneous mix of devices with different input capabilities, Streitz, N., Geiβler, J., Holmer, T., Konomi, S., Müller-Tomfelde, C., Reischl, W., Rexroth, P., Seitz, P., and Steinmetz, R., "i-LAND: An interactive Landscape for Creativity and Innovation," in Proc. of the ACM Conf. on Human Factors in Computing Systems, pp. 120-127, 1999. Enabling a user to perform input with absolute mapping when working on their personal laptop or handheld systems, while allowing the users to switch to relative mapping for controlling pointers on other displays is desirable.

Johanson et al. described a pointing technique, called PointRight, Johanson, B., Hutchins, G., Winograd, T., Stone, M., "PointRight: Experience with Flexible Input Redirection in Interactive Workspaces," in Proc. of the ACM Conf. on User Interface and Software Technology, pp. 227-234, 2002. That technique allows a user to move a system pointer across the displays of multiple systems using a single indirect device, such as a mouse. In that case, a user can manipulate graphical objects displayed on a handheld as well as objects displayed on wall mounted displays. Users can also be positioned around a touch-sensitive table surrounded by large vertical displays. While nearby displays in such a multi-display setting could benefit from direct input, it would be tedious to force users to walk to distant displays in order to interact with the graphic objects. On the other hand, indirect input would allow users to work with distant displays, but would be awkward for objects on nearby displays.

Up to now, system designers must select between an absolute direct input modality or a relative indirect input modality when implementing systems. However, it is desirable to provide an input mechanism that enables fluid switching between relative and absolute mappings, while using a direct input device, thus, enabling users to benefit from the best of both input modalities.

SUMMARY OF THE INVENTION

The embodiments of the invention provide a system and method for dynamically controlling a mapping between movements of a direct input device and a display pointer in either an absolute or a relative mode.

The system and method can use any number of direct input devices, such as a touch-sensitive surface or an active stylus, and is appropriate for both single display and multi-display computational environments.

BRIEF DESCRIPTION OF THE DRAWINGS

FIGS. 3A-3B are schematics of visual feedback according to embodiments of the invention;

DETAILED DESCRIPTION OF THE PREFERRED EMBODIMENT

The embodiments of our invention provide a system and method for dynamically mapping movements of a direct input device and a display pointer in both an absolute mapping mode and a relative mapping mode.

Figure 1A:
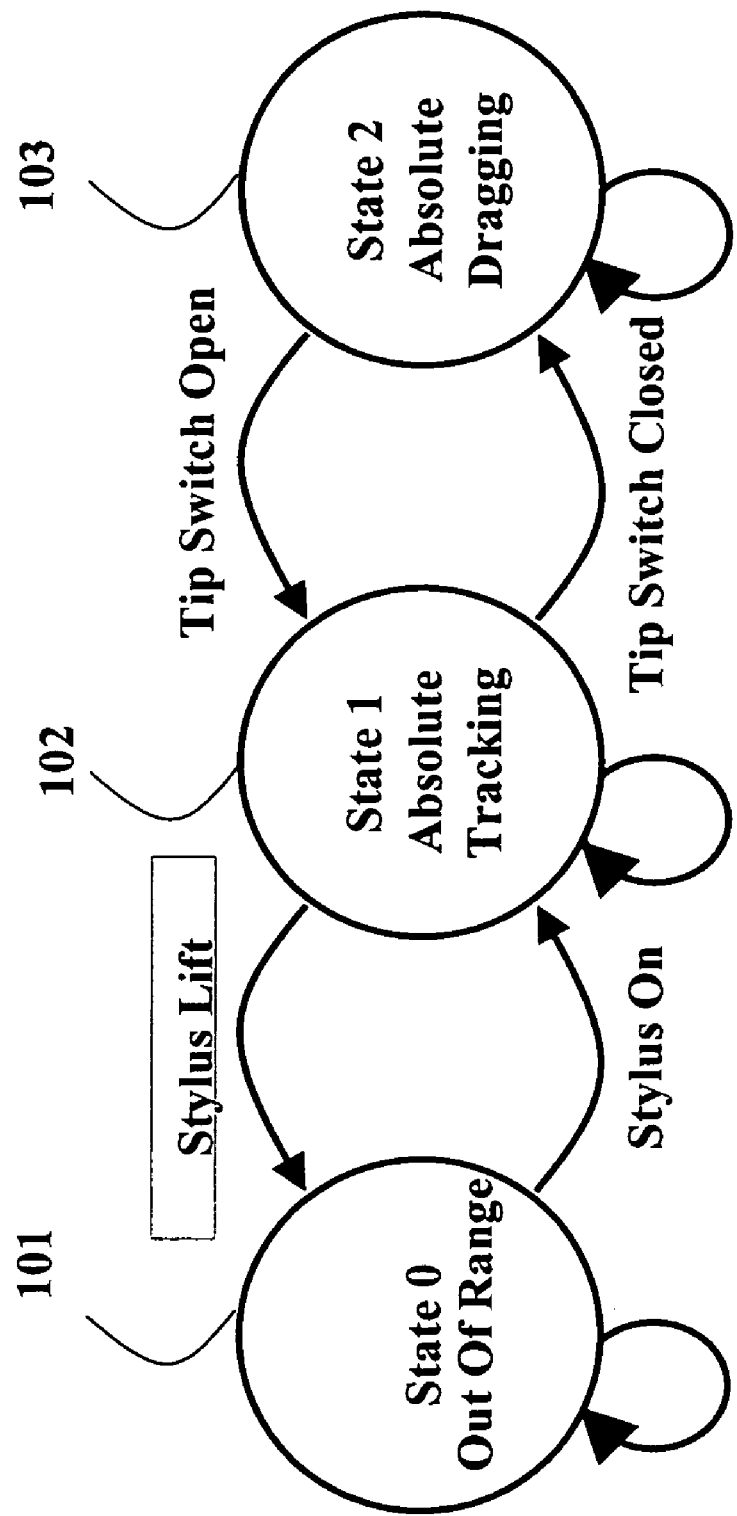
FIGS. 1A and 1B are state diagrams for prior art systems that use absolute and relative mapping between an input device and a pointer.
Figure 1B:
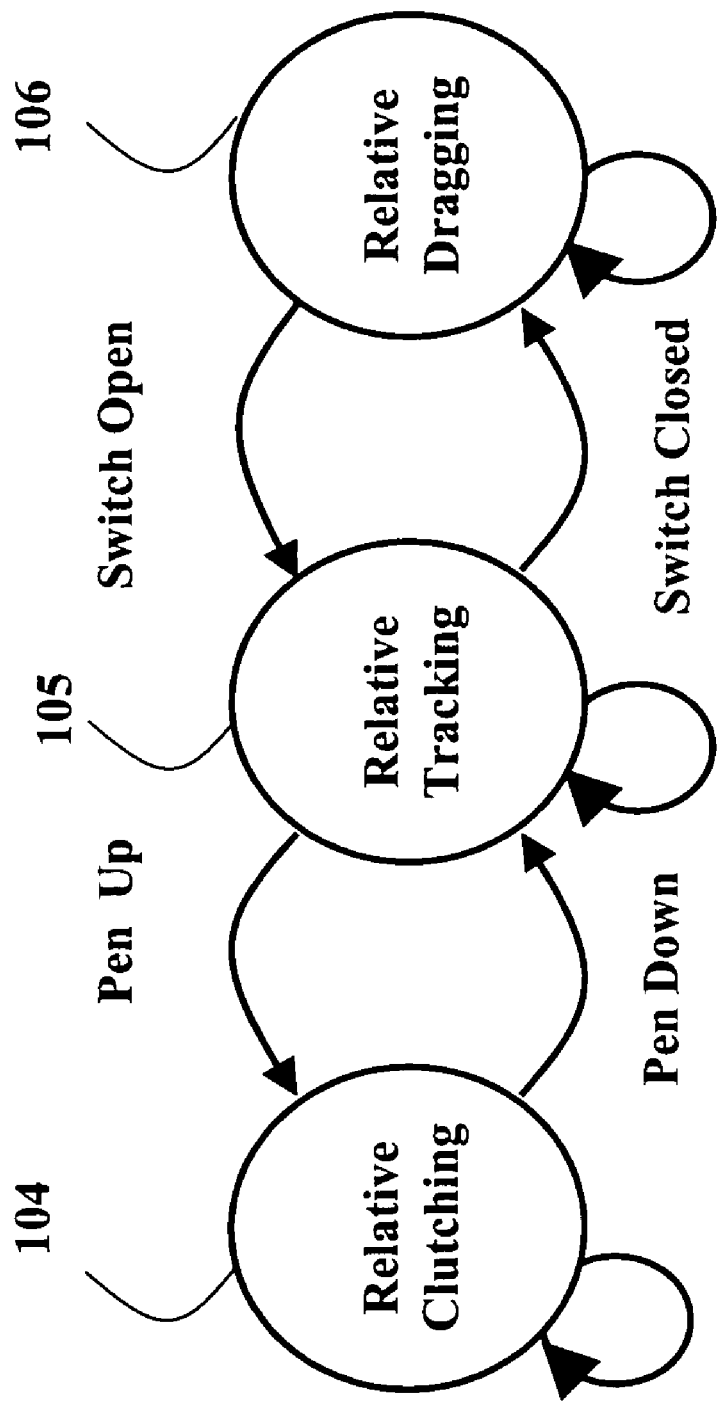
Figure 1C:
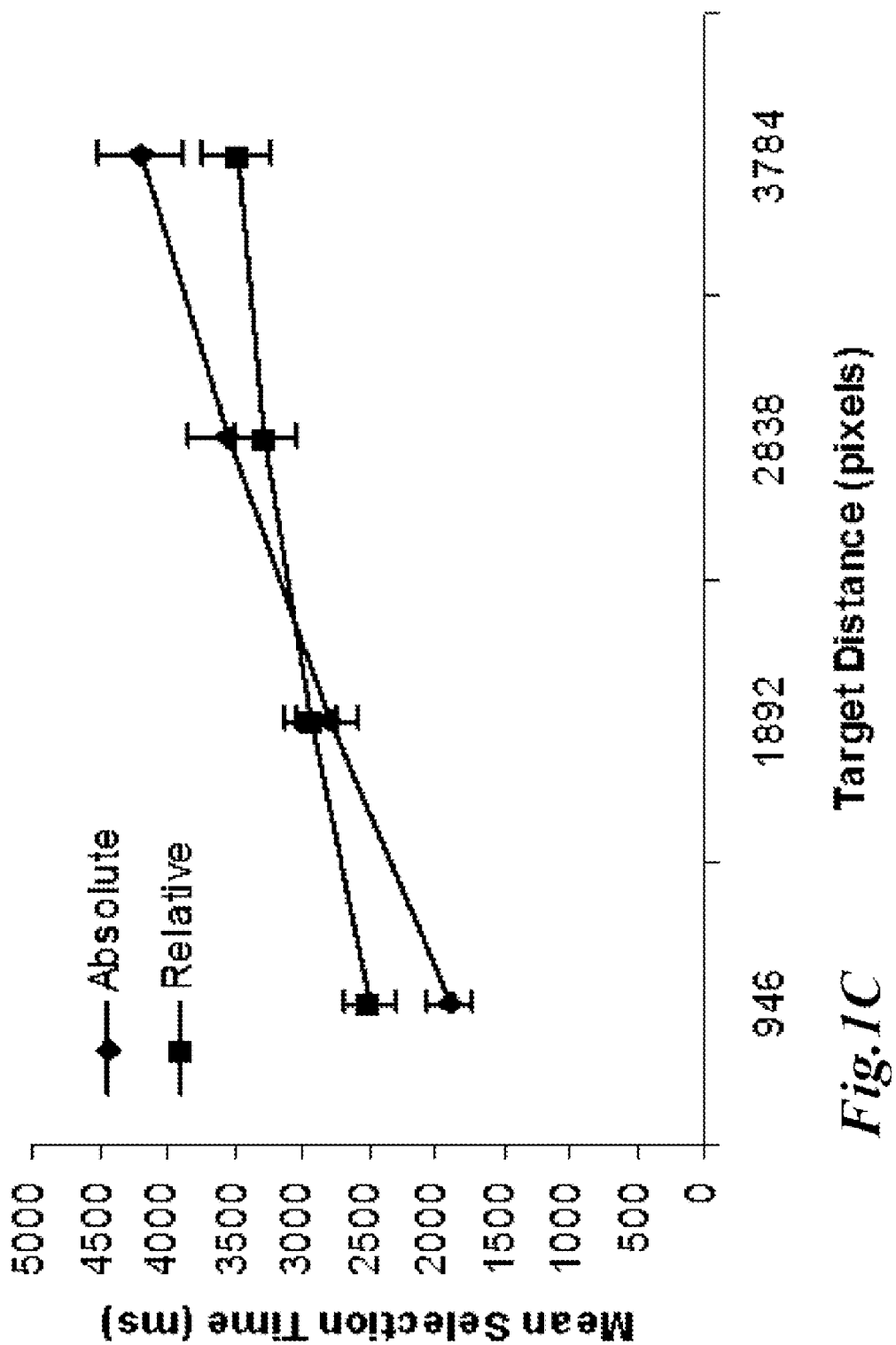
FIG. 1C compare user performance for absolute and relative mapping.
Figure 2A:
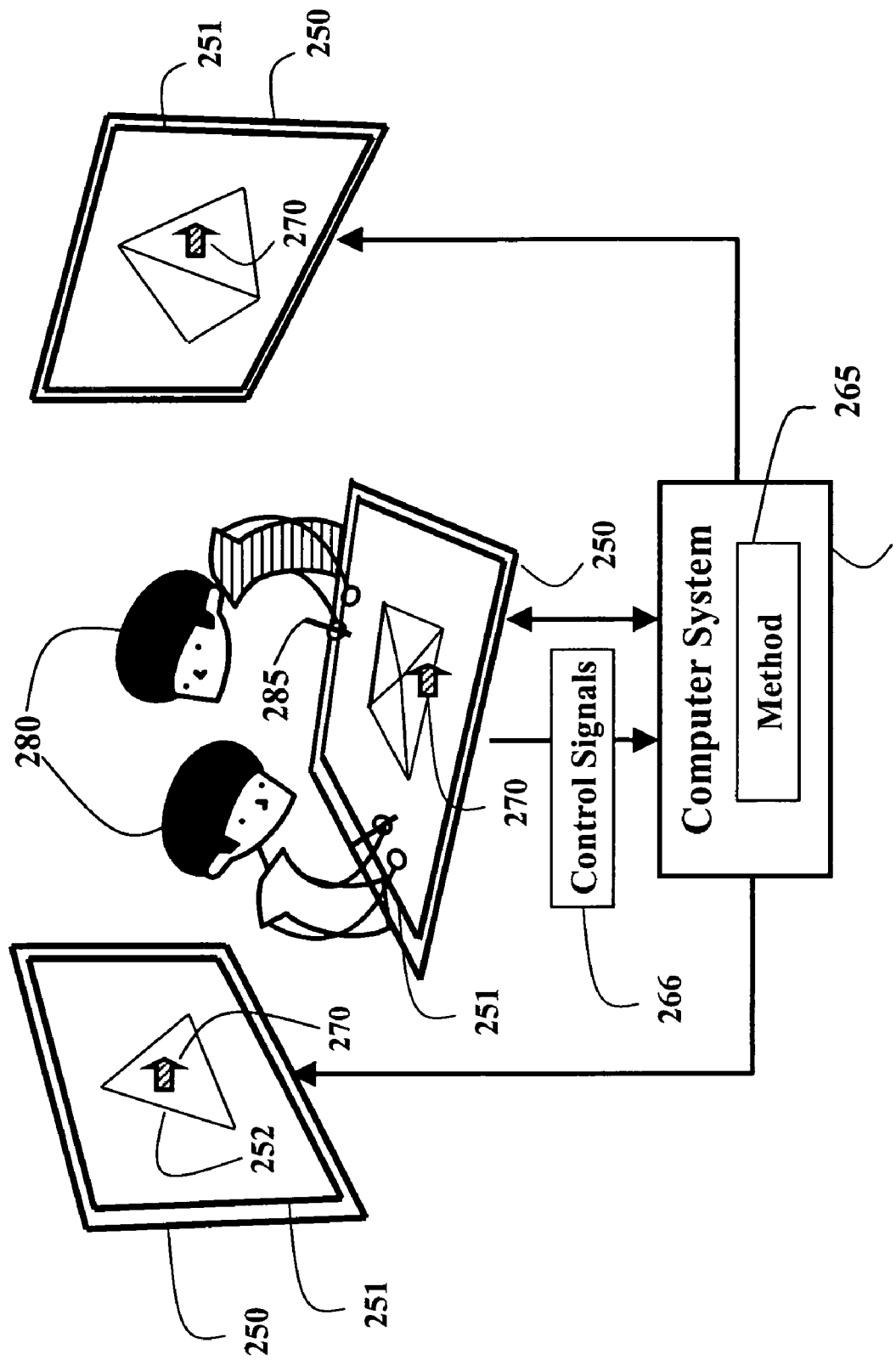
FIG. 2A is a block diagram of a system for switching between absolute mapping
and relative mapping for a direct input device according to an embodiment of the invention.

FIG. 2A shows a system according to one embodiment of the invention. The system includes output display devices 250 for displaying graphic images 251. The graphical images include graphic object 252 that are to be manipulated by users 280. One of the display devices is in the form of tabletop with a direct-touch-sensitive surface acting as an input device for embodiments of our invention. The surface can be touched by a stylus 285 or one or more fingers. Moreover, multiple touches by multiple users can be uniquely identified with the users by the system. A pointer 270 can be displayed. The location of the pointer on the display corresponds to a position touched, U.S. Pat. No. 6,498,590, "Multi-User Touch Screen," issued to Dietz et al. on Dec. 24, 2002, incorporated herein by reference.

The display devices and input device are connected to a computer system 260. The computer system is conventional, e.g., a PC, a laptop, and the like. The computer system includes a processor, memories, and I/O interfaces. The input device passes control signals 266 to the computer system 260 in response to user input. The control signals can indicate movement of a stylus or an on/off state of a stylus switch, or movement of a finger, or a tapping of one or more fingers on the touch sensitive surface. The computer system can execute a method 265 for dynamically mapping movements of the direct input device to movements of the display pointer 270 in both absolute and relative mapping modes.

It is the goal of our invention to provide the users with a method for easily switching between absolute and relative mapping and interaction with a direct input device such as a stylus or touch sensitive surface.

Figure 2B:
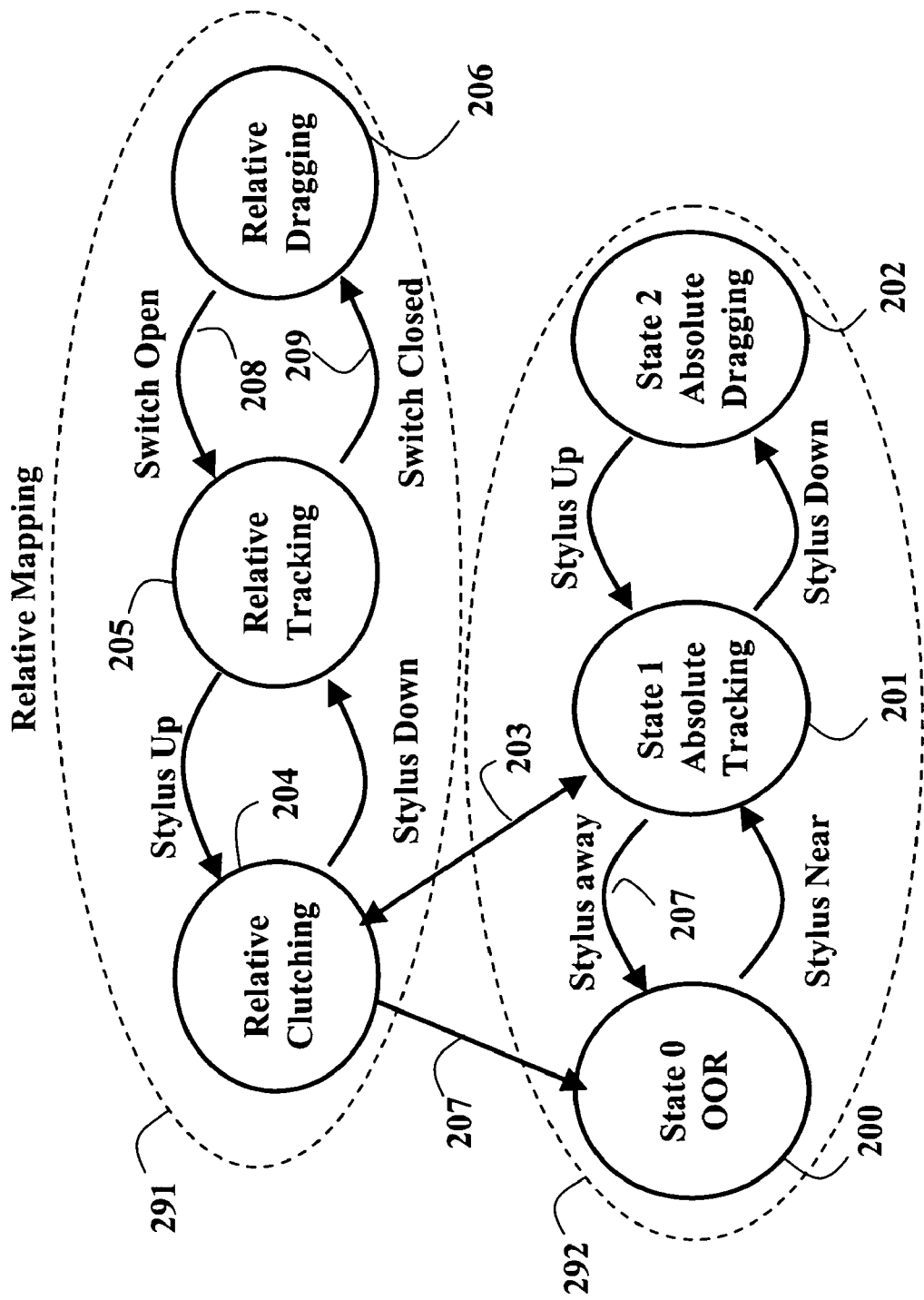
FIG. 2B is a state transition diagram for the system of FIG. 2A according to an embodiment of the invention.

FIG. 2B is a state transition diagram for an embodiment of our method and system that switches between an absolute mapping mode 292 and a relative mapping mode 291. The system uses a stylus, such as that included with a touch sensitive tablet computing device. It should be understood that it is also possible implement the method with a touch sensitive surface that is pointed at by one or more fingers. The system begins in State 0 200. At this time the stylus or finger is out of sensing range (OOR) of the input device. Moving the stylus or finger has no effect.

When the stylus is moved into the sensing range of the input device, the system enters State 1 201, and the graphical pointer is displayed directly under the position of the stylus or finger and the pointer is moved as the stylus is moved.

Placing the stylus tip down in contact with the touch sensitive display surface moves the system into State 2 202. The location of pointer continues to track the position of the stylus tip, while executing commands in the graphical application, such as dragging.

Lifting the stylus up off of the display returns the system to State 1 201. While in State 1 201, a quick flick 203 of the stylus transitions the system into a relative clutching state 204. This same transition can be effected by simultaneously touching the surface with two fingers.

From this state, by placing the stylus tip down against the display moves the system into relative tracking state 205. Now the movement of the stylus or finger results in movements of the pointer in a relative mapping mode, the graphical pointer 270 is no longer directly under the pen tip.

Pressing the stylus firmly down against the display surface 209, thereby closing a stylus switch, moves the system into relative dragging 206, during which commands are executed in the application such as when a mouse button is pressed in a typical personal computer. This transition can also be performed with a two finger touch. A button connected to the input device can also be used to perform this function. Relieving pressure on the stylus, while keeping contact with display surface 208, opens the stylus switch, and transititions the system back into relative tracking state 205.

From relative tracking 205, lifting the stylus up from the display moves the system back to the relative clutching state 204. Now, movements of the stylus produce no movements of the pointer. If the stylus is moved away 207 beyond from the sensing range of the input device, the system returns to OOR State 0 200.

Visual/Aural Feedback

Figure 3B:
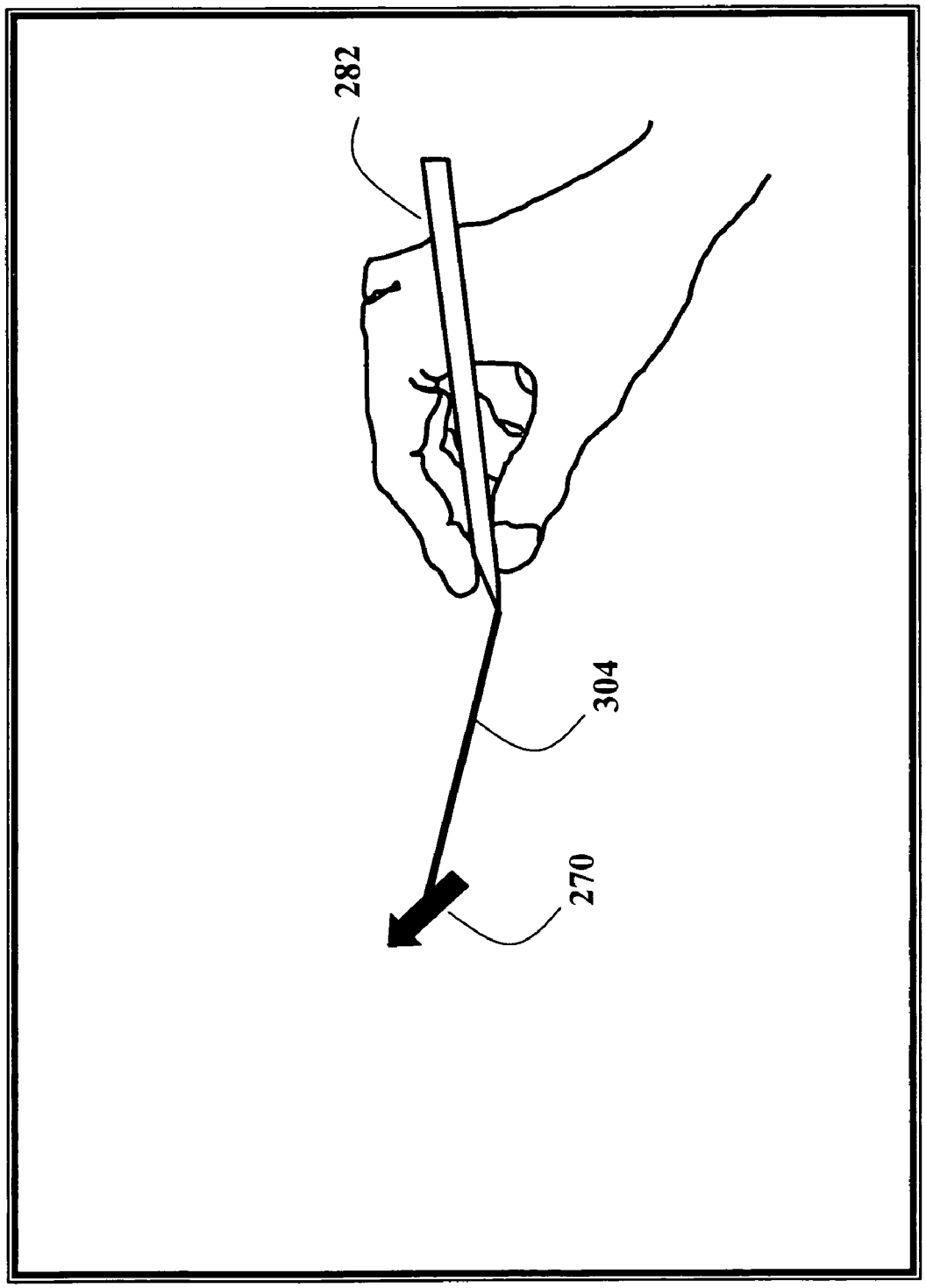

We implemented several means of visual and auditory feedback to communicate the current mapping mode and switches between states. FIG. 3A shows the location of the graphical pointer 270 on the display surface 250 with respect to the position of the stylus 282 when the system is in absolute mapping mode 291. FIG. 3B shows the graphical pointer 270 in respect to the stylus 282 when the system is in relative mapping mode 292. To indicate to the user of our invention, the current mapping, either relative or absolute, our invention alters an appearance of the pointer 270, e.g. black and white, between the two modes. Similarly, the computer system 260 can play a sound when switching between the two modes.

Additionally, when in the relative mode 292, a line 304 displayed. The line connects the location of the pointer to the position of the stylus. This line not only reminds the user that the user is in relative mapping mode, but also helps the user locate the pointer on large displays.

It should be noted that while FIG. 3A and FIG. 3B illustrate the user of our invention performing input with a stylus that this method of input is appropriate for other direct input devices, such as a touch sensitive table controlled with one or more fingers.

Variations

In addition to allowing the user to switch between absolute and relative mapping modes 291-292, it is also possible to achieve transitions between mappings during a dragging operation. The transitions between relative dragging and absolute dragging are particularly interesting. Moving from absolute mapping to relative mapping while dragging an object enables a user to direct a graphic object to distant part of the display in a manner similar to the Go-Go interaction technique described presented by Poupyrev et al., "The Go-Go interaction technique: non-linear mapping for direct manipulation in VR," in Proceedings of the 9th annual ACM symposium on User interface software and technology, pp. 79-80, 1996. Conversely, when a distant object is selected in relative mapping mode, it can be "vacuumed in" and placed directly under the stylus as described by Bezerianos et al. In both cases, the user can continue to work with the selected object without interruption.

Figure 4:
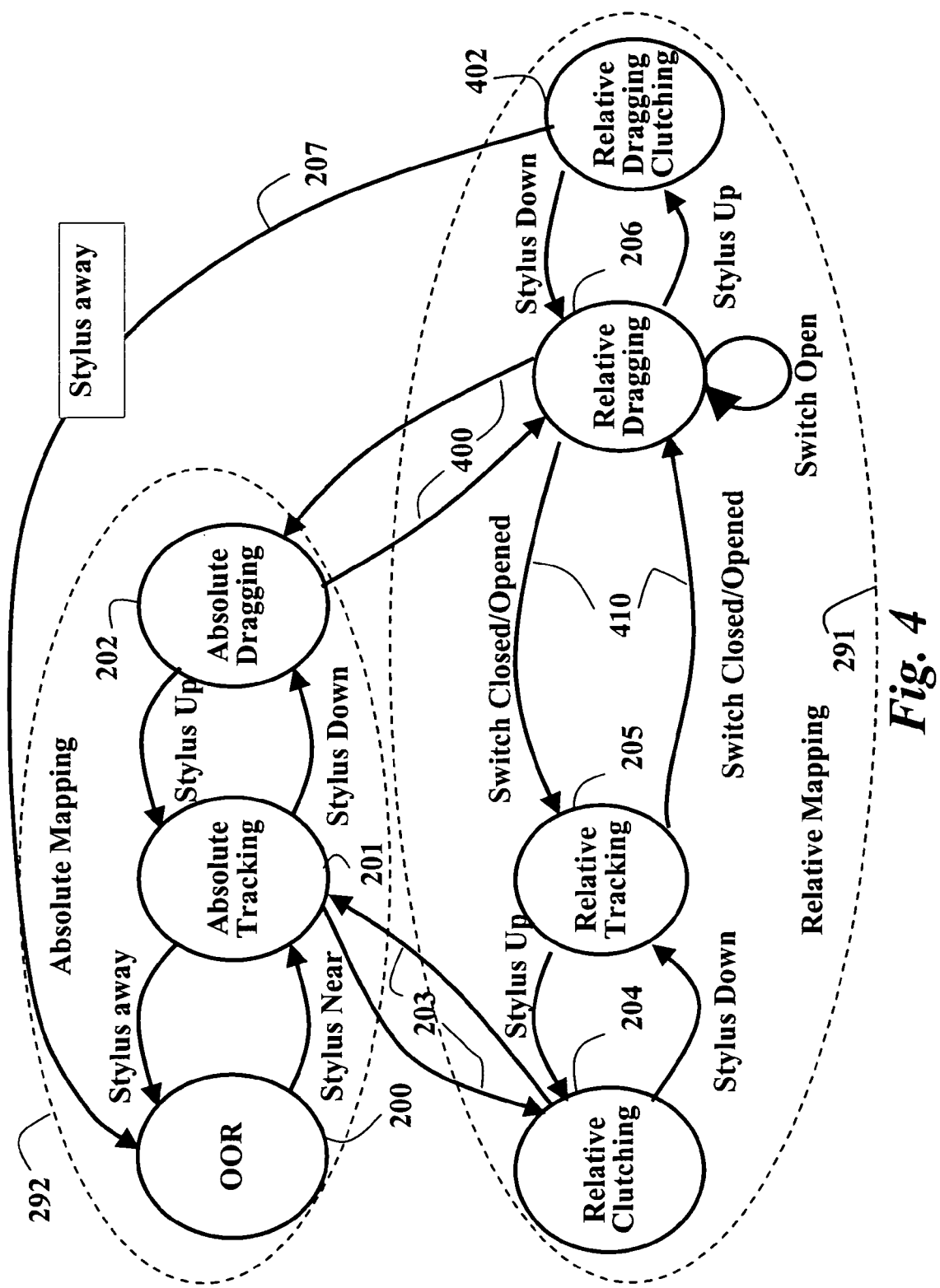
FIG. 4 is a state transition diagram of an embodiment of the invention.

FIG. 4 shows a state transition diagram of an embodiment of our invention in which the user can switch between relative and absolute mapping in the middle of a drag operation. Relative dragging clutching 402 occurs when the object under the graphical pointer is acted upon, but movements of the stylus do not result in movements of the graphical pointer. This is analogous to lifting a mouse off of the surface of the desk while holding the left-mouse button down. A "flick" gesture 400, while the stylus is in contact with the display surface, switches the system between absolute dragging 202 and relative dragging input 206. Changing between relative dragging 206 and relative tracking is achieved with switch close and open action 410.

Similarly, the flick gesture 203, while the stylus is above the display surface, switches the system between absolute tracking 201 and relative clutching 204. When in the relative dragging clutching state 402, lifting the stylus out of the sensing range of the input device 207 ends the manipulation of the graphical object under the graphical pointer and returns the system to state 0 200.

Figure 5:
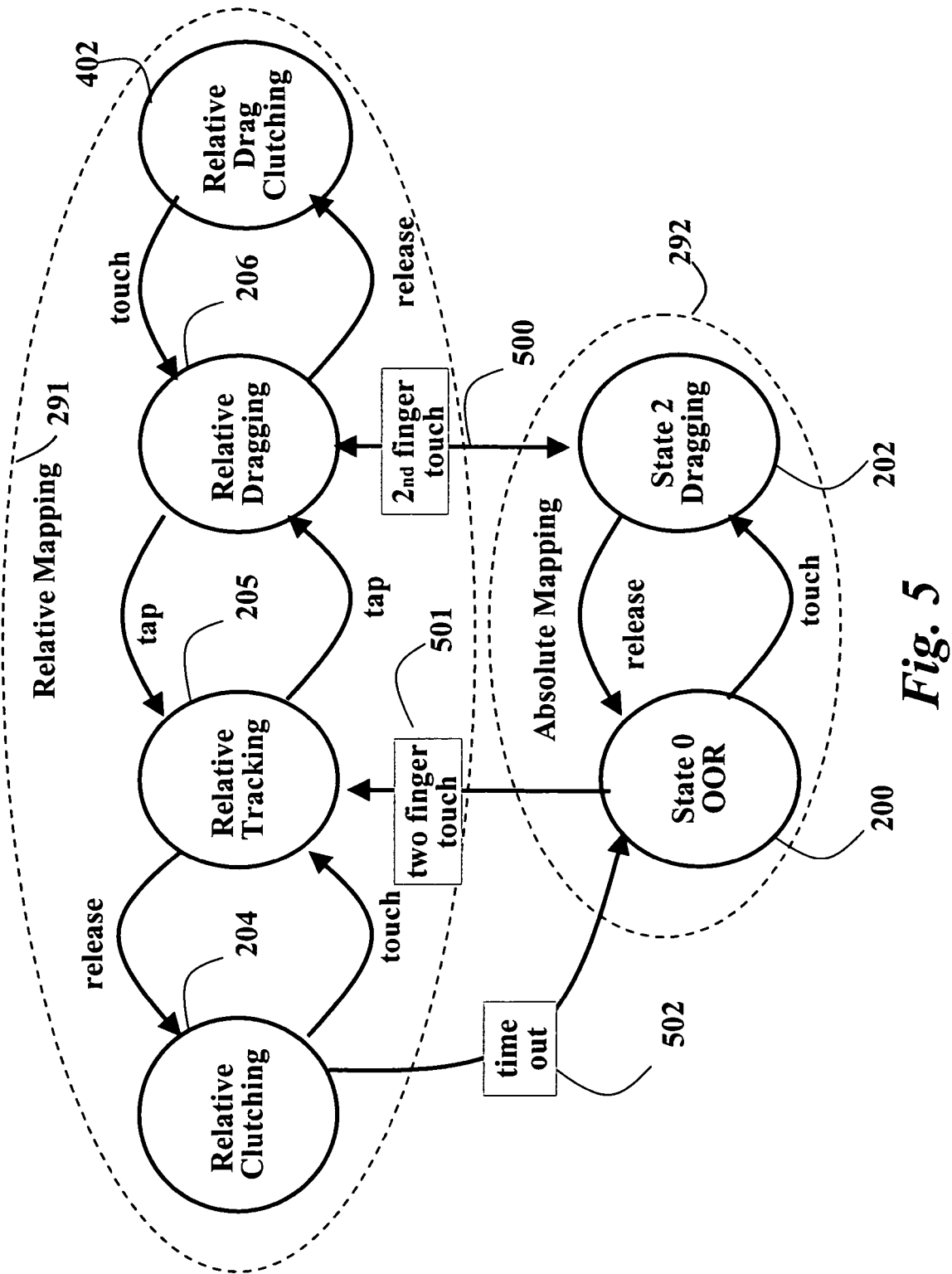
FIG. 5 is a state transition diagram of an embodiment of the invention using touch-sensitive input devices.

FIG. 5 shows an embodiment of our invention that uses a touch-sensitive input device capable of sensing one or more fingers. The initial state is State 0 input 200. Touching the display with a single finger transitions the system into dragging "State 2" 202. Touching the display simultaneously with two fingers 501 transitions the system into relative tracking state 205. While in the relative tracking state, releasing one finger has no effect, releasing both fingers transitions the system to the relative clutching 204 state, and taping the display surface with one finger moves system to the relative dragging 206 state. The user can also switch between relative dragging state 206 and absolute dragging 202 by touching the display with a second finger 500. If the user remains in the relative clutching state 204 longer than a predetermined amount of time, the system signals a "timeout condition" 502, and return to state 0 input 200.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for mapping positions of a direct input device to locations of a pointer displayed on a surface, comprising:
    mapping absolutely between physical positions of a direct input device and virtual locations of a pointer on a display device when operating in an absolute mapping mode, in which the direct input device is a touch-sensitive graphic display surface;
    identifying uniquely multiple touches on the direct input device with multiple users:
    mapping relatively between the physical positions of the direct input device and the virtual locations the pointer when operating in a relative mapping mode; and
    switching between the mapping absolutely and the mapping relatively in response to control signals detected from the direct input device.

2. The method of claim 1, in which the direct input device includes a stylus and a touch sensitive tablet computer device.

3. The method of claim 1, in which the absolute mapping includes an out of range state, an absolute tracking state, and an absolute dragging state, and the relative mapping includes a relative clutching state, a relative tracking state, and a relative dragging state.

4. The method of claim 3, in which the control signal transitions between the absolute tracking state and the relative clutching state.

5. The method of claim 3, in which the control signal transitions from the relative clutching state to the out of range state.

6. The method of claim 4, in which the direct input device includes a stylus and a touch sensitive tablet computer device, and in which the control signal is in response to flicking the stylus.

7. The method of claim 5, in which the direct input device includes a stylus and a touch sensitive tablet computer device, and in which the control signal is in response to lifting the stylus out of a sensing range of the tablet computer device.

8. The method of claim 4, in which the direct input device is a touch-sensitive graphic display surface, and in which the control signal is in response to sensing two simultaneous touchings.

9. The method of claim 5, in which the direct input device is a touch-sensitive graphic display surface, and in which the control signal is in response to lifting a finger from the surface.

10. The method of claim 1, in which the pointer is displayed at a location that corresponds to the position of the direct input device in absolute mapping mode.

11. The method of claim 1, in which the pointer is displayed at a location that is an offset location from the position in the relative mapping mode.

12. The method of claim 11, further comprising:
displaying a line connecting the location and the position.

13. The method of claim 1, further comprising:
changing an appearance of the pointer when switching.

14. The method of claim 1, further comprising:
playing a sound when switching.

15. The method of claim 3, in which the relative mapping further comprises a relative dragging clutching state, and in which the control signal transitions from the relative dragging clutching state to the out of range state.

16. The method of claim 15, in which the direct input device includes a stylus and a touch sensitive tablet computer device, and in which the control signal is in response to lifting the stylus out of a sensing range of the tablet computer device.

17. The method of claim 15, further comprising:
transitioning between the absolute dragging state and the relative dragging state according to the control signal.

18. The method of claim 5, in which the control signal is in response to a timeout condition.

19. The method of claim 1, in which the control signal is in response to a user pressing a button connected to the direct input device.

20. The method of claim 18, in which the button is on a computer stylus.

21. A system for mapping positions of a direct input device to locations of a pointer displayed on a display device, comprising:
means for mapping absolutely between physical positions of a direct input device and virtual locations of a pointer on a display device when operating in an absolute mapping mode, in which the direct input device is a touch-sensitive graphic display surface;
means for identifying uniquely multiple touches on the direct input device with multiple users;
means for mapping relatively between the physical positions of the direct input device and the virtual locations the pointer on the display device when operating in a relative mapping mode; and
control signals received by the means for mapping absolutely and the means for mapping relatively configured to switch between the means for absolute mapping and the means for relative mapping.

* * * * *